United States Patent [19]

Seaberg

[11] Patent Number: 4,699,565
[45] Date of Patent: Oct. 13, 1987

[54] LIFT TRUCK LOAD-HANDLING ATTACHMENT HAVING VERTICALLY-SLIDABLE QUICK-DISCONNECT HOOK

[75] Inventor: Richard D. Seaberg, Vancouver, Wash.

[73] Assignee: Cascade Corporation, Portland, Oreg.

[21] Appl. No.: 754,756

[22] Filed: Jul. 15, 1985

[51] Int. Cl.⁴ .................. B66F 9/12; F16B 21/09
[52] U.S. Cl. .................. 414/785; 403/317; 403/324; 414/607
[58] Field of Search .......... 414/785, 607, 912, 667, 414/671; 403/324, 317, 316, 381, 331, 348

[56] References Cited

U.S. PATENT DOCUMENTS

| | | | |
|---|---|---|---|
| 4,230,434 | 10/1980 | Seaberg | 414/607 |
| 4,389,133 | 6/1983 | Oberst | 403/331 X |
| 4,406,575 | 9/1983 | Gaibler | 414/667 |
| 4,482,286 | 11/1984 | Farmer et al. | 414/607 |
| 4,498,398 | 2/1985 | Vallee | 403/381 X |

OTHER PUBLICATIONS

Long Reach Manufacturing—Forward Drum Dumper Brochure, Apr. 1979.
Brudi Series E Challenger Brochure (undated).
Little Giant Quick Release Attachment Mountings Brochure, Mar. 1983.
Clark Equipment Company-Quick Change Kit Brochure (undated).
HMC Quick-Detach-Hydraulic Machine Company Brochure (undated).
Auramo Drawing (undated).
Long Reach Quick-Change Mounting Hooks Brochure (undated).

*Primary Examiner*—Robert J. Spar
*Assistant Examiner*—Stuart J. Millman
*Attorney, Agent, or Firm*—Chernoff, Vilhauer, McClung & Stenzel

[57] ABSTRACT

A lift truck load handling attachment having a quick-disconnect hook assembly for quick mounting or demounting of the attachment on a lift truck carriage. The hook assembly comprises a hook mounting member fastened to the rearwardly-facing surface of the frame of the load-handling attachment, slideably mounting an upwardly-facing hook for vertical reciprocation of the hook relative to the mounting member. The hook and mounting member respectively have elongate, vertically-oriented interlocking slides for permitting such vertical reciprocation while preventing rearward movement of the hook relative to the mounting member. A locking pin is selectively insertable transversely to limit downward movement of the hook relative to the mounting member, and the vertical slides and pin are located below the engagement surface of the hook when in its engaged position so as to permit direct abutment between the front of the lift truck carriage and rear of the attachment frame. The hook is further selectively lockable by the pin so as to limit upward movement of the hook in a lower position so that the hook can serve as a pedestal. The hook mounting member is adjustable for permitting variation of the height of both the hook and the mounting member relative to the attachment frame.

9 Claims, 8 Drawing Figures

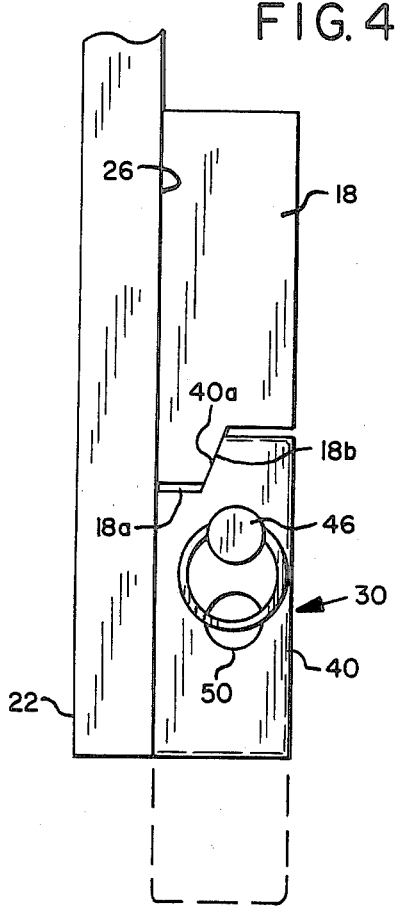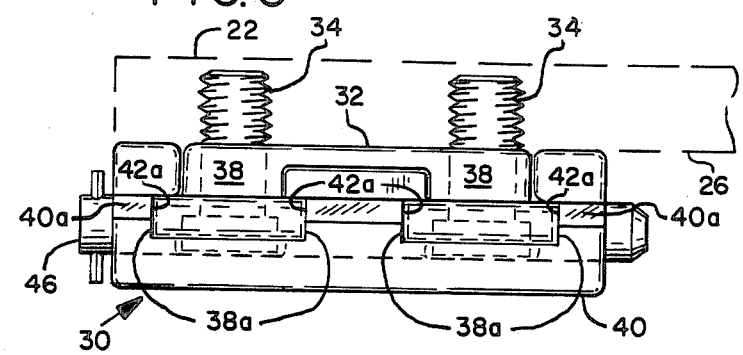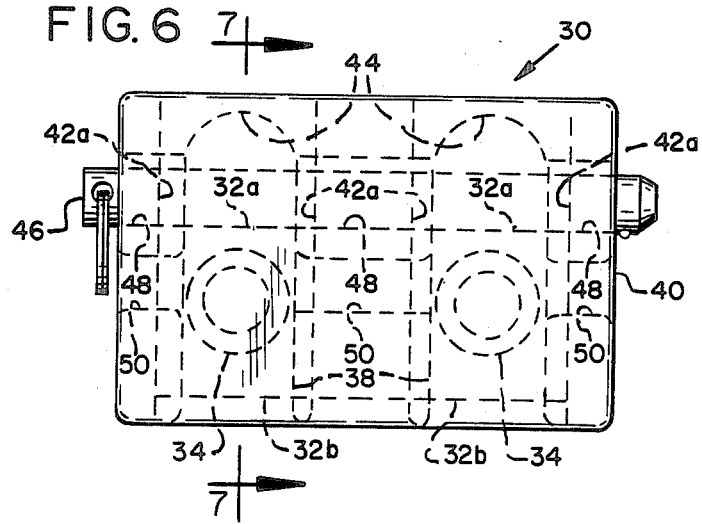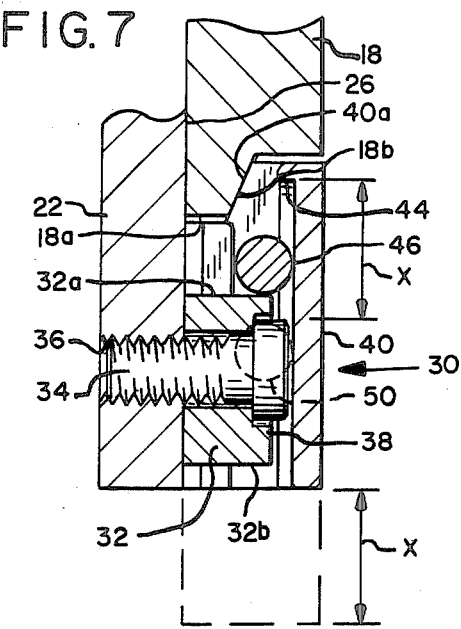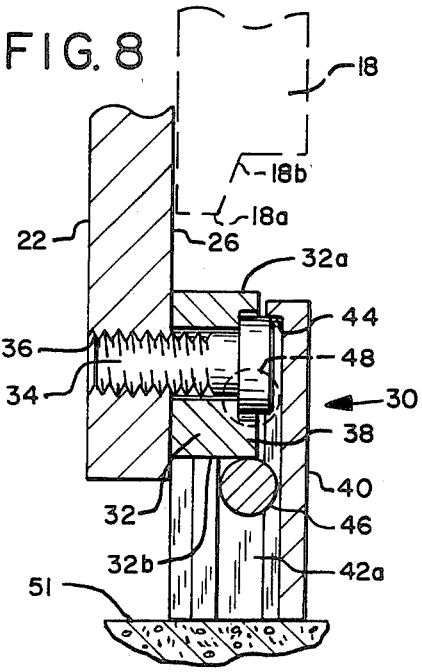

LIFT TRUCK LOAD-HANDLING ATTACHMENT HAVING VERTICALLY-SLIDABLE QUICK-DISCONNECT HOOK

BACKGROUND OF THE INVENTION

The invention relates to improvements in a quick-disconnect structure by which a load-handling attachment is removably mounted upon a lift truck carriage to permit quick mounting or demounting of the attachment. In particular, the invention relates to a vertically-slidable, upwardly-facing hook structure mounted adjacent the bottom of a load-handling attachment for engaging the downwardly-protruding lip of a standardized lower horizontal mounting bar on the front of a lift truck carriage.

Quick-disconnect hooks for engaging such standardized lower horizontal mounting bars are now commonly used on lift truck load-handling attachments. Most such hooks are rotatably mounted to the rearwardly-facing surface of the attachment frame so as to pivot about a forwardly-extending axis, such as the hooks shown in U.S. Pat. Nos. 4,230,434 and 4,406,575. Alternatively, other types of quick-disconnect hooks pivot about a transverse axis, such as that shown in U.S. Pat. No. 4,482,286 or, although not pivotable, utilize a transverse locking pin. A disadvantage of all of the foregoing hook assemblies is that the pivot axis pin or transverse locking pin, as the case may be, must absorb all, or at least part, of the reactive force preventing forward movement of the attachment relative to the bottom of the lift truck load carriage. Such reactive force can be very substantial incident to the pulling or withdrawing of a load, or the striking of an obstacle by the attachment or load as it is being lowered by the lift truck mast. The shear and bending stresses imposed on such pins by such reactive force frequently cause bending or breakage of the pins.

A few prior quick-disconnect hook assemblies feature either a pivotal or vertically-slidable hook locked in its engaged position by a transverse pin which is not required to absorb such reactive force. However these structures have a hook whose forwardly-facing engagement surface, when in its engaged position, is located below the upper extremity of the hook-mounting member. Such assemblies, if used on the rear surface of a load-handling attachment to engage the lower horizontal bar of a lift truck carriage, would require a space between the rear surface of the attachment and the forward surface of the lift truck carriage sufficient to accommodate the hook-mounting member. Any such space reduces the load-carrying capacity of a counterbalanced lift truck by increasing the forward protrusion of the load-handling attachment by the distance required to provide such space.

Another type of prior quick-disconnect hook assembly features a hook-mounting member, mounted on the rear surface of a load-handling attachment frame, having a vertically-reciprocating hook whose engagement surface, when locked in its engaged position, is located above the upper extremity of the mounting member, thereby requiring no space between the carriage and attachment frame to accommodate such mounting member. The mounting member provides resistance to forward movement of the attachment relative to the bottom of the load carriage by enclosure of the hook within a surrounding vertical slot in the mounting member. However such hook assembly requires a locking pin which projects forwardly into a closed depression formed in the mounting member. This, together with the face that the mounting member encloses the hook in a surrounding fashion, makes the hook assembly susceptible to the build-up of dirt and other debris which can eventually impede the proper operation of the locking structure and the free vertical reciprocation of the hook.

Moreover, while at least some of the foregoing structures provide some vertical adjustability of the engaged position of the hook, none provides any corresponding vertical adjustability of the hook mounting member. Lack of vertical adjustability of the hook mounting member relative to the frame of the load-handling attachment can cause difficulty in mounting of the attachment because the lower horizontal bar of the lift truck carriage must temporarily be placed in a position lower than normal, relative to the load-handling attachment, during the mounting procedure to enable the top of the carriage to be raised into engagement with the upper, downwardly-facing hooks of the load-handling attachment. Accordingly, the upper extremity of the hook mounting member should be sufficiently low to avoid interfering with the abutment of the lower horizontal bar of the carriage against the rear surface of the attachment frame when such bar is in such temporarily lowered position. Since the distance between the top of a lift truck load carriage and the bottom of the lower horizontal bar is not uniform from truck to truck, adjustability of the vertical position of the mounting member relative to the lift truck attachment frame is needed to ensure the necessary clearance.

SUMMARY OF THE INVENTION

The present invention compatibly solves all of the foregoing problems of prior quick-disconnect hook assemblies by providing a mounting member and hook interconnected by a vertically-oriented slide structure which permits vertical sliding of the hook relative to the mounting member but prevents rearward movement of the hook relative to the mounting member, thereby enabling the slide structure to absorb all reactive force resisting the forward displacement of the loadhandling attachment relative to the bottom of the lift truck load carriage. The slide structure cooperates with a selectively insertable transverse locking pin which locks the hook in its engaged position without absorbing any of such reactive force.

The engagement surface of the hook, when in its engaged position, is located above the upper extremity of the slide structure so as to require no space between the front of the lift truck carriage and the rear surface of the load-handling attachment, thereby minimizing the forward protrusion of the attachment and maximizing the load-handling capacity of a counterbalanced lift truck upon which the attachment is mounted.

Both the slide structure and transverse locking pin structure, because of their open nature, are highly resistant to clogging by dirt or other debris which might otherwise impede their functions.

The mounting member is adjustably attachable to the rear surface of the attachment frame at different vertical heights so as to eliminate any likelihood of interference with the lower horizontal bar of the lift truck carriage during the mounting procedure.

The foregoing and other objectives, features and advantages of the present invention will be more readily

BRIEF DESCRIPTION OF THE DRAWINGS

FIG. 4 is a side view of the hook assembly shown in its engaged position.

FIG. 5 is a top view of the hook assembly in its engaged position.

FIG. 6 is a rear view of the hook assembly in its engaged position.

FIG. 7 is a sectional view taken along line 7—7 of FIG. 6.

FIG. 8 is a sectional view showing the hook in its locked disengaged position acting as a pedestal.

DESCRIPTION OF THE PREFERRED EMBODIMENT

Figure 1:
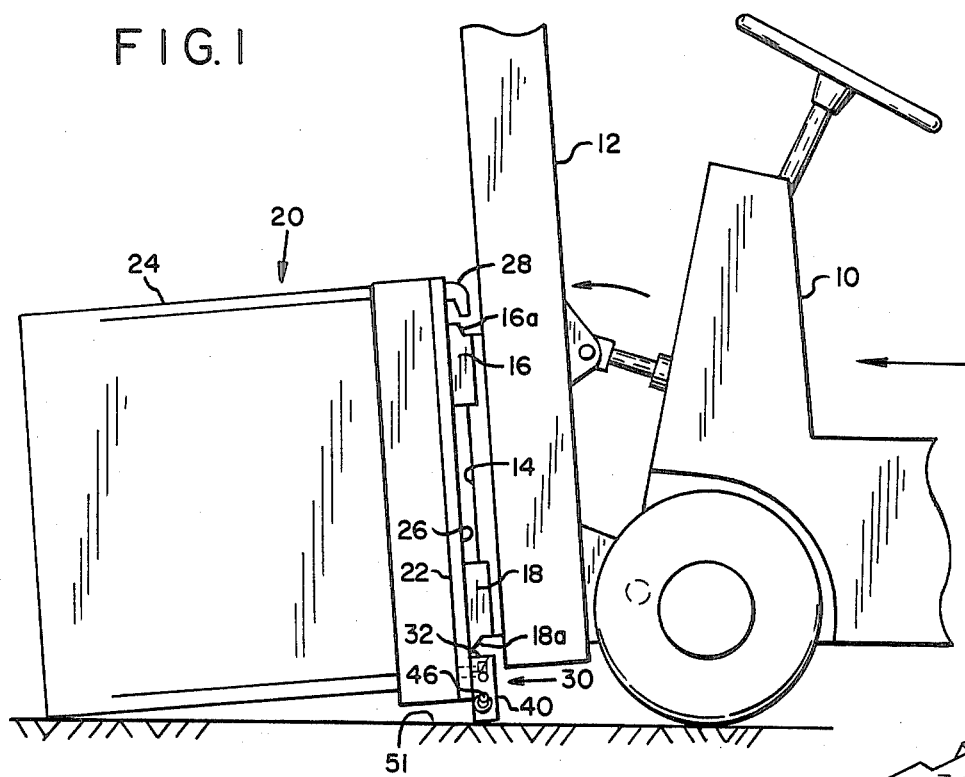
FIG. 1 is a partial, simplified side view of a lift truck in the act of mounting a load-handling attachment having a quick-disconnect hook assembly in accordance with the present invention.
Figure 2:
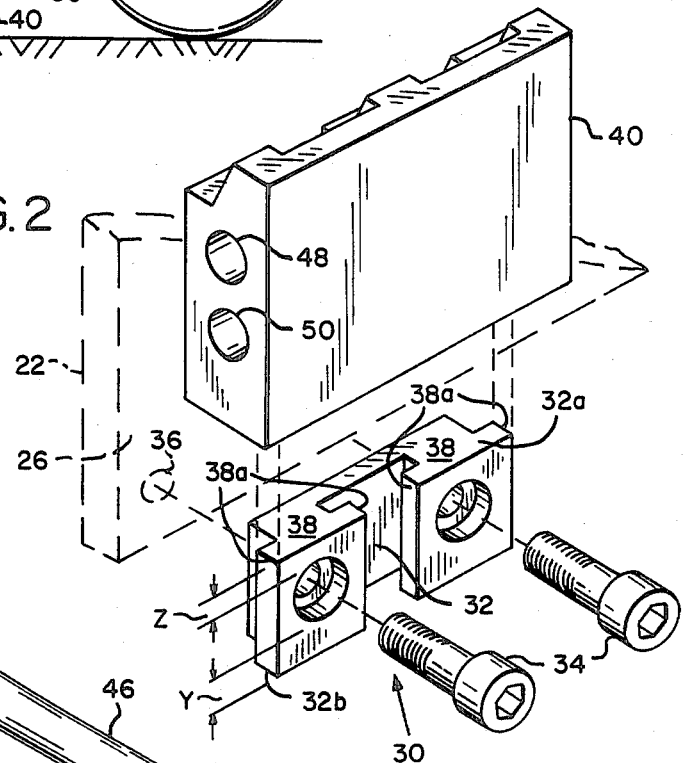
FIGS. 2 and 3 are exploded perspective views of the quick-disconnect hook assembly of the present invention.
Figure 3:
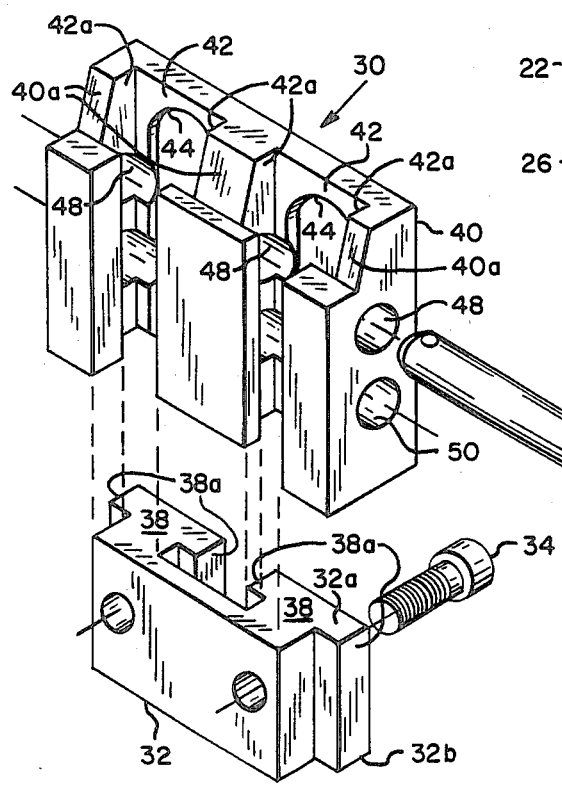

With reference to FIG. 1, a lift truck 10 is depicted having a load-lifting mast 12 mounted at the front thereof. Mounted upon the mast 12 and vertically-movable with respect thereto is a load carriage 14 having upper and lower horizontal attachment mounting bars 16 and 18 respectively affixed to the front thereof, bar 16 having an upwardly-extending lip 16a and bar 18 having a downwardly-extending lip 18a. A load-handing attachment, designated generally as 20, comprises a frame 22 upon which are mounted forwardly-extending load-handling members which may be of any suitable type, such as a pair of clamp arms 24, only one of which is shown. Mounted upon the rearwardly-facing surface 26 of the attachment frame 22 are a transversely spaced pair of downwardly-facing fixed upper hooks 28 (only one of which is shown) for matingly engaging lip 16a, and a transversely spaced pair of upwardly-facing lower quick-disconnect hook assemblies 30 (only one of which is shown) for matingly engaging the rearwardly facing surface 18b of lip 18a.

The hook assembly 30 is shown in greater detail in FIGS. 2–8, and comprises a hook-mounting member 32 fastened to the rearwardly-facing surface 26 of the frame 22 by a pair of cap screws 34 threaded into respective apertures 36 formed in the frame 22. The mounting member 32 has an upper extremity defined by an upper, transversely-extending engagement surface 32a and a lower extremity defined by a lower, transversely-extending engagement surface 32b. Extending vertically between the upper and lower engagement surfaces 32a and 32b are a pair of transversely-spaced, elongate slides 38 having generally T-shaped cross-sections each having a pair of transverse legs 38a.

Slidably mounted upon the hook-mounting member 32 for vertical reciprocation relative thereto is an upwardly-facing hook 40 having a pair of transversely-spaced, vertically-oriented T-shaped guides 42 slidably interlocking with the slides 38, each guide 42 having a pair of transverse channels 42a for slidably engaging the respective legs 38a of the slides 38. The hook 40 has a forwardly-facing engagement surface 40a for engaging the rearwardly-facing surface 18b of the lip 18a when in a raised, engaged position as shown in FIGS. 4–7. The guides 42 are open at both the top and the bottom, permitting a large range of vertical motion of the hook 40 and permitting the hook 40 to be lifted completely off of the hook mounting member 32 for assembly and disassembly purposes, or for cleaning of the slides and guides. The slide and guide assembly also permits lowering of the hook 40 from its engaged position, but it is prevented from sliding completely off of the bottom of the mounting member 32 by the provision of a pair of lips 44 which interfere with the heads of the respective cap screws 34 upon lowering of the hook 40 relative to the hook-mounting member 32, as shown in FIG. 8.

An elongate locking pin 46 is selectively slidably insertable transversely through three aligned transverse apertures 48 formed in the hook 40. When the hook is in its raised engaged position shown in FIGS. 4–7, the inserted pin rests on the upper engagement surface 32a of the mounting member 32 so as to prevent downward movement of the hook 40 relative to the mounting member 32. In this position the upper engagement surface 32a of the mounting member 32 is below the forwardly-facing engagement surface 40a of the hook 40. This arrangement eliminates any need for the mounting member 32 to extend upwardly into a position where it might require space between the lower hoirzontal bar 18 of the lift truck carriage and the rear surface 26 of the attachment frame 22.

In order to disconnect the hook 40 from the lip 18a, it is necessary only to withdraw the pin 46 thereby permitting the hook 40 to drop downwardly by the distance X shown in FIG. 7 until limited by the interference between the lips 44 and the cap screws 34. Such downward movement of the hook 40 enables a second group of transverse apertures 50 formed in the hook to move below the lower engagement surface 32b of the mounting member 32 such that insertion of the locking pin 46 in the apertures 50 will cause the pin to engage the lower engagement surface 32b and prevent upward movement of the hook 40 relative to the mounting member 32. In this lowered position, the hook 40 acts as a pedestal elevating the bottom of the load-handling attachment above the ground 51 to facilitate reconnection of the loadhandling attachment to the lift truck carriage, as shown in FIGS. 1 and 8.

The interlocking relationship of the slides 38 and guides 42 of the mounting member 32 and hook 40, respectively, resists all forces tending to move the bottom of the load-handling attachment 20 forwardly with respect to the bottom of the lift truck carriage 14, as previously discussed, due to the fact that the channels 42a of the guides 42 impose a reactive, rearwardly-directed shear force on the legs 38a of the slides 38. The fact that the pin 46, when the hook 40 is in its engaged position, merely rests upon a horizontal upper engagement surface 32a of the mounting member 32, rather than passing through an aperture or the like in the mounting member 32, ensures that none of such rearwardly-directed reactive shear force will be imposed upon the pin 46, which might otherwise bend or break the pin. Moreover, the presence of pin-engaging apertures 48 only in the hook 40 ensures that the pin 46 can be inserted easily and rapidly since there is no necessity to align apertures in relatively movable parts. Finally, the transverse orientation of the apertures 48 ensures that they are open-ended and thereby resistant to filling with dirt or other debris which might make insertion of the pin difficult or impossible. It will be recognized that an equivalent structure could comprise transverse apertures in the mounting member 32 with only horizontal engagement surfaces on the hook 40 to engage the pin 46.

Another advantage of the foregoing vertical slide and guide structure is that no portion of the mounting member 32 need protrude rearwardly in surrounding relationship to the hook 40 in order to provide the necessary resistance to forward displacement of the attachment relative to the bottom of the lift truck carriage. This provides a relatively open slide structure resistant to clogging with dirt or debris, and enables the quick-disconnect hook assembly to be relatively narrow in a fore-and-aft direction thereby minimizing the likelihood of interference with any other lift truck components.

It will be noted that the lower engagement surface 32b of the mounting member 32 is located a greater distance Y (FIG. 2) from the cap screw 34 than the distance Z by which the upper engagement surface 32a is separated from the cap screw 34. This feature permits the mounting member 32 to be attached adjustably to the load-handling attachment frame 22 in either of two orientations wherein the upper extremity of the mounting member 32 is at different vertical heights relative to the attachment frame 22. One such orientation is shown in the figures. The other orientation would simply involve inverting the mounting member 32 so that the engagement surface 32b becomes the upper engagement surface. Such adjustable feature varies not only the height of the engaged position of the hook 40, but also varies the height of the upper extremity of the mounting member 32 to ensure adequate clearance between the member 32 and the lower horizontal bar 18 of the lift truck carriage during temporary depression thereof while engaging the upper hook 28, as depicted in FIG. 1 and discussed previously.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A load-handling attachment, adapted for mounting upon the front of a vertically-movable lift truck load carriage having an attachment mounting member thereon of the type which includes a downwardly-protruding lip having a rearwardlyfacing surface, comprising:
    (a) a frame with a rearwardly-facing surface adapted to abut against the front of said load carriage;
    (b) an upwardly-facing hook having a forwardly-facing engagement surface for engaging said rearwardly-facing surface of said lip;
    (c) hook mounting means, fastened to said rearwardly-facing surface of said frame, slidably mounting said hook for vertical reciprocation of said hook relative to said mounting means;
    (d) said hook and said mounting means respectively having elongate, vertically-oriented, interlocking slide means for permitting vertical sliding reciprocation of said hook relative to said mounting means while preventing rearward movement of said hook relative to said mounting means;
    (e) an elongate locking pin;
    (f) pin-receiving means on said hook and mounting means resectively for accommodating the selective insertion or withdrawal of said locking pin in a transverse direction and, when said locking pin is inserted transversely, engaging said pin so as to limit downward movement of said hook relative to said mounting means;
    (g) said hook mounting means having an upper extremity located below said forwardly-facing engagement surface of said hook when said hook is limited against downward movement relative to said mounting pin by insertion of said locking pin; and
    (h) said locking pin, when inserted transversely, engaging said mounting means at a location below said forwardly-facing engagement surface of said hook.

2. The apparatus of claim 1 wherein said hook and mounting means respectively include further means vertically spaced from said pin-receiving means for accommodating the selective insertion or withdrawal of said locking pin in a transverse direction and, when said locking pin is inserted transversely in said further means, engaging said pin so as to limit upward movement of said hook relative to said mounting means, said hook being in a lower position relative to said mounting means when limited against upward movement than when limited against downward movement.

3. The apparatus of claim 1 wherein said means on said hook and mounting means for accommodating the selective insertion or withdrawal of said locking pin in a transverse direction inludes means for engaging said locking pin while preventing the imposition of rearwardly-directed shear forces on said pin by said hook.

4. A load-handling attachment, adapted for mounting upon the front of a vertically-movable lift truck load carriage having an attachment mounting member thereon of the type which includes a downwardly-protruding lip having a rearwardly-facing surface, comprising:
    (a) a frame with a rearwardly-facing surface adapted to abut against the front of said load carriage;
    (b) an upwardly-facing hook having a forwardly-facing engagement surface for engaging said rearwardly-facing surface of said lip;
    (c) hook mounting means, fastened to said rearwardly-facing surface of said frame, slidably mounting said hook for vertical reciprocation of said hook relative to said mounting means;
    (d) said hook and said mounting means respectively having elongate, vertically-oriented, interlocking slide means for permitting vertical sliding reciprocation of said hook relative to said mounting means while preventing rearward movement of said hook relative to said mounting means;
    (e) an elongate locking pin;
    (f) means on said hook and mounting means respectively for accommodating the selective insertion or withdrawal of said locking pin in a transverse direction and, when said locking pin is inserted transversely, engaging said pin so as to limit downward movement of said hook relative to said mounting means;
    (g) said hook mounting means having an upper extremity located below said forwardly-facing engagement surface of said hook when said hook is limited against downward movement relative to said mounting means by insertion of said locking pin;

(h) said locking pin, when inserted transversely, engaging said mounting means at a location below said forwardly-facing engagement surface of said hook; and (i) one of said hook and mounting means respectively, but not the other, including means defining an aperture for matingly surrounding said pin.

5. The apparatus of claim 1 wherein said elongate, vertically-oriented, interlocking slide means comprises a pair of relatively slidable parts, a first part being on said hook and a second part being on said mounting means, said hook and mounting means respectively including mutually-engageable means for limiting the downward movement of said hook relative to said mounting means when said locking pin is not inserted transversely in engagement with said hook and mounting means, said mutually-engageable means permitting said first part of said slide means to extend below said second part of said slide means.

6. The apparatus of claim 1 wherein said hook extends rearwardly of said interlocking slide means.

7. The apparatus of claim 1 further including adjustable means for vertically varying, relative to said rearwardly-facing surface of said frame, the height of said hook at which said hook is lim9ited against downward movement relative to said mounting means by insertion of said locking pin.

8. A load-handling attachment, adapted for mounting upon the front of a vertically-movable lift truck load carriage having an attachment mounting member thereon of the type which includes a downwardly-protruding lip having a rearwardly-facing surface, comprising:

(a) a frame with a rearwardly-facing surface adapted to abut against the front of said load carriage;

(b) an upwardly-facing hook having a forwardly-facing engagement surface for engaging said rearwardly-facing surface of said lip;

(c) hook mounting means, fastened to said rearwardly-facing surface of said frame, slidably mounting said hook for vertical reciprocation of said hook relative to said mounting means;

(d) said hook and said mounting means respectively having elongate, vertically-oriented, interlocking slide means for permitting vertical sliding reciprocation of said hook relative to said mounting means while preventing rearward movement of said hook relative to said mounting means;

(e) selectively releasable locking means interacting with said hook and mounting means for limiting downward movement of said hook relative to said mounting means; and (f) said interlocking slide means comprising at least a pair of transversely-spaced, elongate, vertically-oriented slide and guide assemblies, each of said pair of assemblied including a slide having a generally T-shaped transverse cross section including two transverse legs, and a guide having a mating generally T-shaped transverse cross section including two transverse channels for slidably engaging said legs.

9. A load-handling attachment, adapted for mounting upon the front of a vertically-movable lift truck load carriage having an attachment mounting member thereon of the type which includes a downwardly-protruding lip having a rearwardly-facing surface, comprising:

(a) a frame with a rearwardly-facing surface adapted to abut against the front of said load carriage;

(b) an upwardly-facing hook having a forwardly-facing engagement surface for engaging said rearwardly-facing surface of said lip;

(c) hook mounting means, fastened to said rearwardly-facing surface of said frame, slidably mounting said hook for vertical reciprocation of said hook relative to said mounting means;

(d) selectively releasable locking means interacting with said hook and mounting means for limiting downward movement of said hook relative to said mounting means;

(e) said hook mounting means having an upper extremity located below said forwardly-facing engagement surface of said hook when said hook is limited against downward movement relative to said mounting means by said locking means;and (f) adjustable means fastening said hook mounting means to said rearwardly-facing surface of said frame for enabling said hook mounting means to be fastened to said frame in multiple positions wherein the upper extremity of said hook mounting means is located at different vertical heights relative to said frame.

* * * * *

UNITED STATES PATENT AND TRADEMARK OFFICE
CERTIFICATE OF CORRECTION

PATENT NO. : 4,699,565
DATED : October 13, 1987
INVENTOR(S) : Richard D. Seaberg It is certified that error appears in the above-identified patent and that said Letters Patent is hereby corrected as shown below:

| | |
|---|---|
| Col. 2, line 3 | Change "face" to --fact-- |
| Col. 2, line 44 | Change "loadhandling" to --load-handling-- |
| Col. 4, line 25 | Change "hoirzontal" to --horizontal-- |
| Col. 4, line 43 | Change "loadhandling" to --load-handling-- |
| Col. 5, line 49 | Change "rearwardlyfacing" to --rearwardly-facing-- |
| Col. 5, line 68 | Change "resectively" to --respectively-- |
| Col. 7, line 25 | Change "lim9ited" to --limited-- |
| Col. 8, line 10 | Change "assemblied" to --assemblies-- |

Signed and Sealed this

Twenty-fourth Day of May, 1988

Attest:

DONALD J. QUIGG

Attesting Officer

Commissioner of Patents and Trademarks